Oct. 11, 1927. 1,645,207
E. SUMNER
TRAIN LIGHTING APPARATUS
Filed Feb. 11, 1927 2 Sheets-Sheet 1
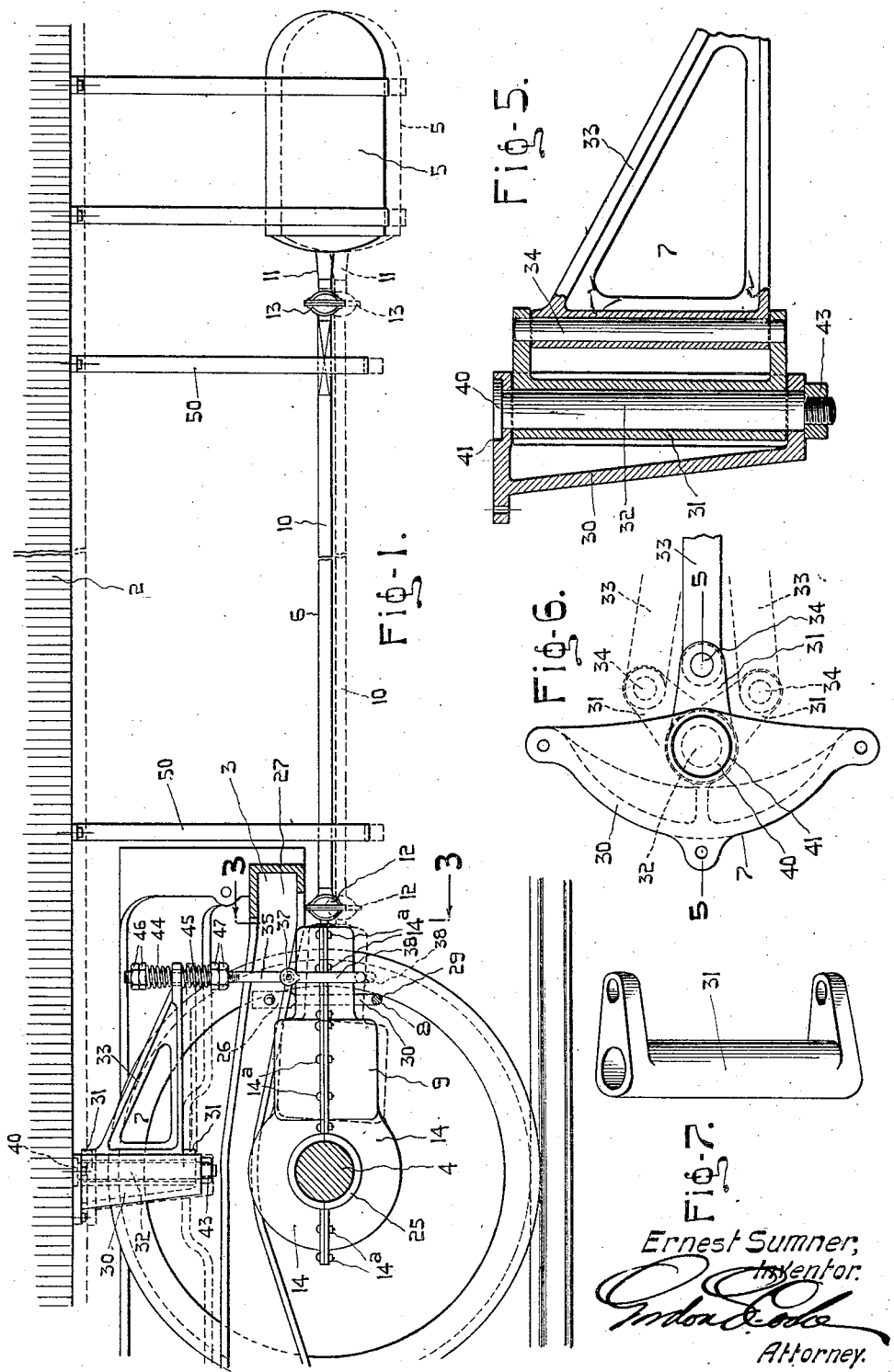
Ernest Sumner, Inventor.
Attorney.

Oct. 11, 1927.  1,645,207
E. SUMNER
TRAIN LIGHTING APPARATUS
Filed Feb. 11, 1927   2 Sheets-Sheet 2
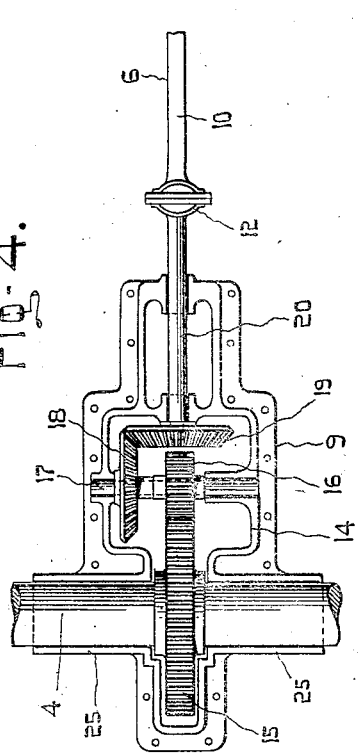
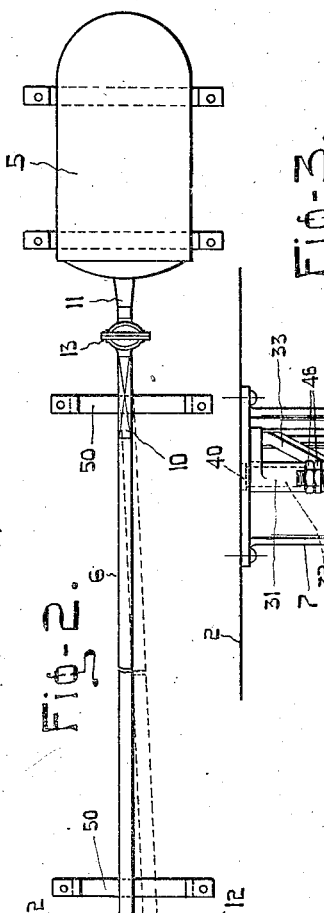
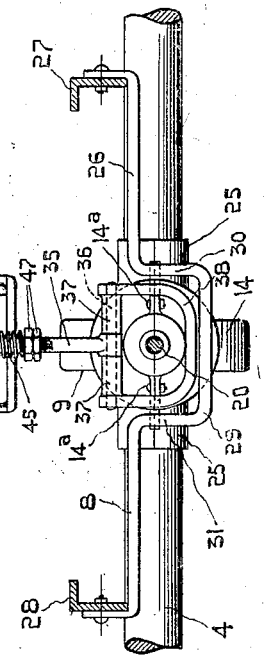
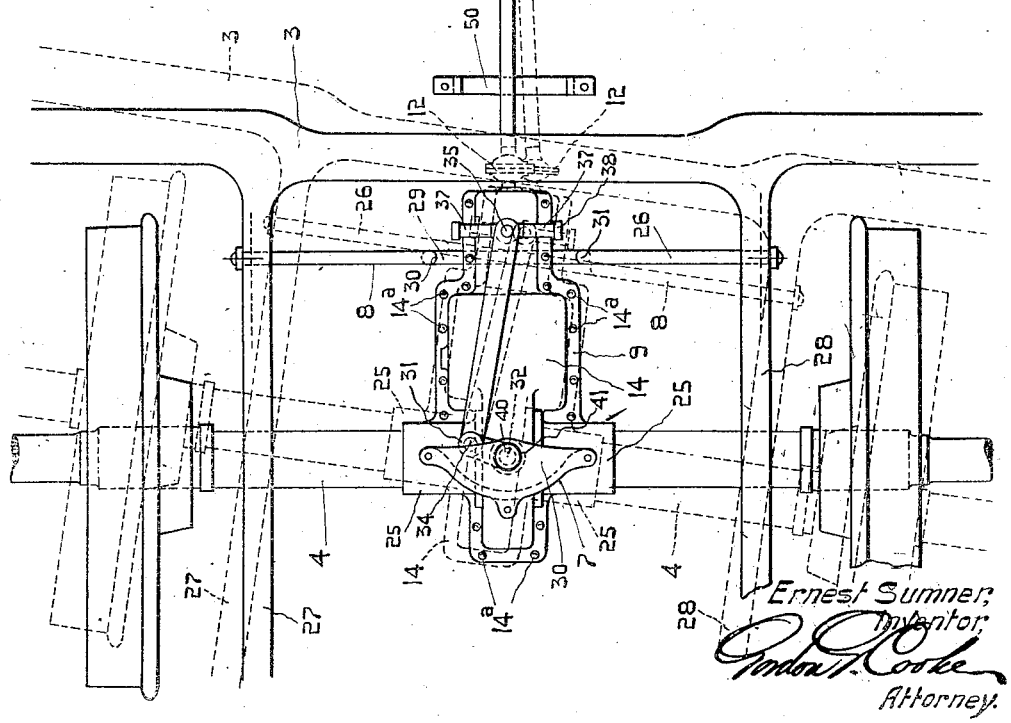

Patented Oct. 11, 1927.

1,645,207

UNITED STATES PATENT OFFICE.

ERNEST SUMNER, OF NEW YORK, N. Y.

TRAIN-LIGHTING APPARATUS.

Application filed February 11, 1927. Serial No. 167,487.

This invention relates to train lighting apparatus of the type disclosed in United States Patent No. 1,288,173 in which a generator or dynamo, mounted on the car body, is driven from one of the truck axles through suitable gear mechanism.

The object of the invention is to provide a train lighting apparatus of this type in which the transmission mechanism between the car axle and generator will be suspended or supported from the car body by new and improved means which is constructed and arranged to allow the transmission mechanism absolute freedom of movement while constituting a firm support therefor.

Further objects are to provide a construction of this type which may be easily and quickly applied to or removed from a railway car, which can be readily repaired, and which can be manufactured at a comparatively low cost.

Other objects will appear as the description progresses.

To this end my invention consists of the construction and particular arrangement of the parts hereinafter described and illustrated and pointed out in the claims.

Figure 1 is a fragmentary side elevation of a railway car showing my new and improved train lighting apparatus applied thereto;

Figure 2 is a plan view of the apparatus per se;

Figure 3 is a sectional view taken on line 3—3 Figure 1.

Figure 4 is a detail view of the transmission unit showing the top of the casing removed.

Figure 5 is a sectional view taken on line 5—5 Figure 6.

Figure 6 is a fragmentary plan view of the compensating element of the suspension means for the transmission.

Figure 7 is a detail perspective view of the compensating element.

Referring to the accompanying drawings, which illustrate the preferred embodiment of my invention, the car body is indicated at 2, one of the car trucks at 3, one of the truck axles at 4, the generator at 5, the transmission between the axle and generator at 6, the suspension means for supporting the transmission from the car body at 7, and emergency means for supporting the transmission from the truck in the event of failure of the car body suspension means, at 8.

The transmission mechanism rotatively connecting the axle to the generator consists of a gear transmission unit mounted upon the axle and indicated at 9, and a telescopic shaft 10 having its opposite ends respectively connected to the generator shaft 11 and the unit, through universal connections 12 and 13.

The gear transmission unit consists of a casing 14 divided horizontally into top and bottom sections bolted together as at 14$^a$ and housing a train of gears comprising spur gear 15 constructed in halves which are clamped together upon the axle and rotatable therewith, spur pinion 16 intermeshing with the spur gear and fixed upon a shaft 17 journalled in the casing in juxtaposition with the axle, a bevel gear 18 also fixed on the last-mentioned shaft and rotatable in unison with the pinion, and a second bevel gear 19 intermeshing with bevel gear 18 and keyed upon the inner end of a short shaft 20. This shaft is disposed at right angles to the axle in longitudinal alignment with the driving gear 15 and its outer end is connected to the universal connection 12.

In order to mount the transmission unit 9 upon the car axle in such manner that it may be swung radially in unison with the axle without danger of disturbing the intermeshing relationship of the gears the side walls of the casing are extended laterally in the form of collars or sleeves 25 which embrace the axle. These extended portions constitute extended bearings which maintain the unit in its proper alignment and cause it to swing with the axle in its radial movements during travel.

It is considered that the provision of these sleeves make it unnecessary to provide extraneous guiding means for the opposite end of the unit, but if it is preferred to provide a supplementary means at this point for assisting the sleeves in moving the unit radially in unison with the car axle this may be accomplished by securing a transverse safety bracket 26 upon the truck members 27 and 28 as indicated in Figures 1 and 2. This bracket at a point substantially midway its length is of U-form and is arranged with the bottom portion 29 spaced from the bottom of the unit and the vertical side portions 30 and 31 in sliding engagement with the side walls of the unit. If the bracket is simply used for safety purposes the sides 30 and 31 need not be in sliding relationship with the unit.

From the foregoing it will be seen that the unit is supported upon the axle adjacent one end and is free to swing in a vertical direction thereon consequently means must be provided for supporting its opposite end to enable it to assume a normally horizontal position. To this end the end of the unit farthest from the axle is suspended from the car body by the suspension means 7 hereinbefore referred to.

This means is so constructed and arranged that it is capable of efficiently performing its supporting function while allowing the unit perfect freedom in its various movements with the axle relatively to the car body during travel of the car. It allows the unit to swing radially with the car truck independently of the car body, when rounding a curve as indicated in Figure 2 or to swing in a vertical direction on an axis constituted by the car axle, as indicated in Figure 1, when the car body moves up and down relatively to the truck and compensates for other changes in the position of the car body relatively to the truck such as occur when the former is displaced horizontally by draft or buffing operations, in each instance relieving the unit it supports of all undue strain.

It is of comparatively simple construction and consists of a bracket 30 rigidly secured in position upon the underside of the car body, a compensating link 31 hingedly mounted in the bracket upon a vertically disposed pin 32, a horizontal cantilever suspension arm 33 hingedly mounted in the link as at 34, and a suspension rod 35 hung from the free end of the arm and flexibly connected to the unit through pin 36, lugs 37, and a band 38 embracing the unit.

It will be noted that the pin 32 is constructed in the form of a bolt the head 40 of which is confined within a recess 41 in the top of the bracket which is closed by the car body so that displacement of the bolt under normal conditions is impossible. The lower end of the pin projects below the bracket and is threaded to receive a nut 43 which may be locked in place by any preferred means.

The suspension rod 35 is flexibly and adjustably mounted in the suspension arm by helical springs 44 and 45 which encircle the rod and are respectively located above and below the arm and bear therebetween and nuts 46 and 47 on the rod. The nuts are locked in position by any preferred locking means and may be adjusted vertically on the rod to take care of changes in the distance between the axis of the car axle and underside of the car body or for any other reason.

In the operation of train lighting apparatus constructed according to the foregoing description it will be seen that interference with the transmission of the driving power from the car axle to the generator by the constantly changing positions of the car truck and car body relatively to one another is almost entirely eliminated notwithstanding the fact that the transmission unit is supported from the body and yet moves independently thereof in unison with the driving axle.

When the unit moves radially with the axle in rounding a curve it swings in an arc concentric with the truck centre and as the radius of this movement is greater than the length of the suspension arm the link 31 automatically alters its angular position relatively to the arm to compensate for the difference thereby in effect altering the length of the arm so that its radial movements always correspond with those of the unit. This is clearly illustrated in Figure 2.

Safety brackets of U-form for supporting the transmission shaft in the event of breakage are indicated at 50 and are secured at their upper ends to the underside of the car body.

What I claim is as follows:

1. In car lighting apparatus, the combination with a generator mounted upon the car body, an axle of the car running gear, and means for rotatively connecting the car axle to the generator; of means for supporting the last-mentioned means from the car body, consisting of suspension means hinged on a fixed vertical axis upon the car body and constructed and arranged to swing with the axle in its radial movements.

2. In car lighting apparatus, the combination with a generator mounted upon the car body, an axle of the car running gear, and means for rotatively connecting the car axle to the generator; of means for supporting the last-mentioned means from the car body, said means consisting of a bracket fixed upon the underside of the car body, and suspension means hinged on a vertical axis in said bracket and constructed and arranged to swing with the axle in its radial movements.

3. In car lighting apparatus, the combination with a generator mounted upon the car body, an axle of the car running gear, and means for rotatively connecting the axle to the generator; of means for supporting said last-mentioned means from the car body, consisting of a horizontally disposed suspension arm connected adjacent one end to the means it supports and adapted to swing with the car axle in its radial movements, a fixture on the underside of the car body, and means hingedly supporting the opposite end of the arm in the said fixture, said last-mentioned means being constructed and arranged to act as an automatic compensator for the horizontal changes in relative position between the car body and axle during travel, substantially as described.

4. In car lighting apparatus, the combination with a generator mounted upon the car body, an axle of the car running gear, and means for rotatively connecting the car axle to the generator; of means for supporting the last-mentioned means from the car body, said means consisting of a suspension arm hinged upon a fixed vertical axis upon the underside of the car body and adapted to swing with the car axle in its radial movements, means connecting the free end of the arm to the means it supports, and compensating means for automatically varying the length of the arm to cause its radial movements to correspond with those of the car axle, substantially as described.

5. In car lighting apparatus, the combination with a generator mounted upon the car body, an axle of the car running gear, a gear transmission unit mounted adjacent one end on the car axle for driving the generator therefrom, and a transmission shaft rotatively connecting the unit to the generator; of means for supporting the unit from the car body consisting of a bracket fixed upon the underside of said body, a compensating link hinged vertically in the bracket, a horizontally disposed suspension arm hinged at one end vertically in the link whereby the link is adapted to automatically adjust the radial length of the arm, substantially as described, a vertical suspension rod, means for yieldingly and adjustably suspending the upper end of the rod in the free end of the arm, and means for flexibly connecting the lower end of the rod to said transmission unit.

6. In car lighting apparatus, the combination with a generator mounted upon the car body, an axle of the car running gear, a gear transmission unit mounted adjacent one end upon the axle and consisting of a train of gears one of which is fixed upon and rotates with the axle, a hollow casing completely housing said gear train, guiding means for swinging the unit in unison with the axle in its radial movements, said guiding means consisting of laterally extended sleeves upon the casing embracing the axle, means hinged from a fixed vertical axis on the underside of the car body for supporting the end of the unit farthest from the axle, and means rotatively connecting the unit to the generator.

7. In car lighting apparatus, the combination with a generator mounted upon the car body, and the frame and axle of one of the supporting trucks, of a gear transmission unit mounted adjacent one end upon the axle and consisting of a train of gears one end of which is fixed upon and rotates upon the axle, a hollow casing completely housing said gear train, guiding means for swinging the unit in unison with the axle in its radial movements, said guiding means consisting of laterally extended sleeves upon the casing embracing the axle, means hinged from a fixed vertical axis on the underside of the car body for supporting the end of the unit farthest from the axle, means for rotatively connecting the unit to the generator and a combined safety bracket and guide secured in transverse position upon the truck frame beneath the unit at a point between said means for supporting the unit from the car body and the axle, said bracket consisting of a unitary member having its intermediate portion downwardly offset in U-form with the vertical sides of the U in guiding relationship with the unit.

Signed at the city of Montreal, Quebec, this 2nd day of February, 1927.

ERNEST SUMNER.